United States Patent [19]
Kuchmak et al.

[11] 3,764,556
[45] Oct. 9, 1973

[54] ALCOHOLIC PRECIPITATION AND 1000X CENTRIFUGATION PREPARATION OF HYPERCHOLESTEROLEMIC AND HYPERTRIGLYCERIDEMIC SERA AS LIPID DETERMINATION CONTROL

[75] Inventors: Myron Kuchmak; Jackie H. Williams; Linnard Taylor; Robert F. Witter, all of Atlanta, Ga.

[73] Assignee: The United States of America as represented by the Secretary of Health Education and Welfare, Washington, D.C.

[22] Filed: Feb. 2, 1971

[21] Appl. No.: 111,839

[52] U.S. Cl. ............................................... 252/408
[51] Int. Cl. .............................................. G01n 3/16
[58] Field of Search ..................................... 252/408

[56] References Cited
UNITED STATES PATENTS
3,260,648  7/1966  Fox .................................... 252/408

FOREIGN PATENTS OR APPLICATIONS
1,066,459  8/1964  Great Britain

OTHER PUBLICATIONS

Mangold Analytical Abstracts, July 1969, Abstract 397, QD71 A 48

Tullis, Blood Cells and Plasma Proteins Pages 337–350 QP91T9.

Boyd, Fundamentals of Immunology, pages 246, Pub. by Interscience Pub. 1947, QR181.K85.

Primary Examiner—Donald Levy
Attorney—Browdy & Neimark

[57] ABSTRACT

The isolation of triglyceride-rich fraction from egg yolk and cholesterol-rich protein fraction from outdated human plasma in order to enhance the triglyceride and cholesterol levels of bovine and horse sera up to 350 mg/100 ml. without an appreciable change in physical properties of the sera are disclosed.

6 Claims, No Drawings

ALCOHOLIC PRECIPITATION AND 1000X CENTRIFUGATION PREPARATION OF HYPERCHOLESTEROLEMIC AND HYPERTRIGLYCERIDEMIC SERA AS LIPID DETERMINATION CONTROL

This invention relates to laboratory techniques for isolating triglyceride and cholesterol rich fractions from chicken eggs and outdated human plasma, respectively, and for the addition of these fractions to equine or bovine sera in order to produce the desired levels of lipids for use as control standards.

Analyses for cholesterol in serum are performed in almost all clinical laboratories; analyses for triglyceride are rapidly coming into widespread use; both are of extreme importance in screening normal populations for risk of cardio-vascular disease. Measures for controlling the accuracy and reliability of these analyses are vitally dependent upon serum materials of known concentration, both as calibration materials and as reference samples. At present, materials with graded elevated levels of these substances are difficult and expensive to prepare and are not generally available commercially. It is an object of the present invention to prepare such materials.

In order to obtain reliable results in any chemical analytical determination of various blood serum components there is a dependency upon the continuous evaluation of the test procedure, equipment and reagents being employed. This can best be accomplished through the concurrent use of controls, such as the analysis of "standards." These controls or standards contain known amounts of the material being analyzed, such as triglyceride and cholesterol. The necessity for adequate controls is important in triglyceride and cholesterol determinations because of frequently reported discrepancies between various analytical laboratories. Since several methods of triglyceride and cholesterol determinations are in routine use, some of which posses the inherent possibility of errors attributable to the instability of reagents or of resulting color, a suitable control is especially useful. Accurate results in the use of instruments, particularly in the case of multi-automated procedures, are dependent upon rigid and constant standardizations of the biochemical determinations.

Normally only excessively high serum cholesterol levels are of clinical significance. The diagnostician wants to know whether his patient has either normal or excessively high serum cholesterol levels. What is needed is a high cholesterol control which contains the normal levels of noncholesterol containing constituents of serum and is, therefore, analogous to the sera of individuals with elevated cholesterol levels. The same is true of triglycerides which in high concentrations produce coronary artery diseases.

Every human being maintains a constant total serum cholesterol level and large deviations from this level do not ordinarily occur. Research directed to the effects of abnormally high total cholesterol blood levels has made it increasingly apparent that the total cholesterol blood level should be controlled and maintained within the limits considered normal for the particular individual. Accordingly, the accurate determination of serum cholesterol is very important for modern diagnostic procedures.

Cholesterol, either in the free form or as an ester, is an essential constitutent of all animal and plant cells. Blood cholesterol, in esterified and free forms, is one of the major blood lipids and is present together with triglycerides. Cholesterol in the blood is distributed almost equally between the plasma and corpuscles with higher concentrations in the leukocytes.

Cholesterol and triglycerides occur in serum in complex association with protein which makes them soluble in the body fluids and water; these comples are quite fragile and cannot be synthesized. The pure materials available in commerce are not soluble, and although rather unusual means have been tried to solubilize them, the products do not simulate serum and introduce many problems of chemical interference. It is another object of the present invention to apply methods of preparation of the native materials from serum to this problem. The resulting serum products are clear solutions, simulating natural serum exactly. The unique value of the products lies in the fact that any desired concentration of either or both substances can be predetermined and obtained.

Materials so prepared represent a valuable source of the very large quantities of serum calibrators employed in (a) automated clinical laboratory analyses, (b) proficiency testing programs of Federal, State and private programs of laboratory evaluation, and (c) in analytical controls of quality employed by most clinical laboratories. While the bulk of these materials is by now prepared and packaged on large manufacturing scale, it is another object to provide products which can be prepared within the laboratory with moderate effort and cost, providing flexibility and economy to the use of reference materials not formerly within reach of the individual laboratory.

Reference sera for cholesterol and triglyceride determinations are also needed for training in methodology. The levels of triglyceride and cholesterol present in these sera must cover a wide range of concentration. The concentration of lipids present in the blood of animals such as horses and cattle from which large amounts of blood can be obtained are too low in and of themselves to be used for these purposes. Another object of the present invention is to raise the triglyceride and cholesterol level of this animal sera which is so readily available for clinical diagnostic use. These preparations can be made readily in most laboratories, thus the lipid levels can be adjusted to fit individual requirements.

These and other objects will become apparent from the following detailed description of the present invention.

For a better understanding of the invention possible embodiments thereof will now be described, it being understood that these embodiments are merely exemplary and not limitative.

The following examples exemplify the invention.

EXAMPLE 1

A triglyceride rich fraction is isolated from a chicken egg yolk by the use of a phosphate buffer. More specifically, the phosphate buffer is prepared as follows: 6.210 g. of $KH_2PO_4$ and 1.422 g. of NaOH are dissolved separately and each is made up to a volume of 100 ml. Then, equal volumes of each solution are combined, diluted 1:4 (final molarity 0.0563), and the pH is adjusted to 7.4.

Egg yolk is combined with the phosphate buffer in the ratio of 1:5 (w/v), respectively, and stirred gently for three minutes. The resulting suspension is centrifuged for 30 minutes at 1000 xg, and the supernatant is decanted and then should be used within one day.

The pH and concentration phosphate buffer used for the extraction of egg triglyceride were chosen after numerous experiments showed that these conditions provided maximal stability for the components extracted. Such extracts usually contain about 3400 mg/ml or 39:4 mM triglyceride, less than 200 mg/100 ml. cholesterol (in the free form), up to 1200 mg/100 ml. (48 mg/100 ml. lipid P) of phospholipid and about 8 percent dry weight. This extract must be used the same day it is prepared since a precipitate forms if the solution is frozen and thawed.

EXAMPLE 2

A cholesterol rich fraction is isolated from outdated frozen human plasma such as may be obtained from the Red Cross. A volume of the pooled plasma having being brought to room temperature is titrated with 1.6–1.8 vol. of 0.025 M acetic acid until pH 5.4 is reached. The volume of absolute ethanol needed to make a mixture of 84.5 percent (v/v) of titrated plasma and acetic acid and 15.5 percent ethanol prepared. The titrated plasma and the prepared volume of ethanol are brought to a temperature of 2° in an ice bath.

Then ethanol is added drop by drop while the titrated plasma is stirred. During this process, the temperature of the new mixture formed must be kept below 5°C. The mixture is distributed into prechilled centrifuge tubes which are placed into a centrifuge at −5°C. Protein precipitation is allowed to proceed for one hour. Then the tubes are centrifuged for 30 minutes at 1000xg at the same temperature. After the supernatant is decanted, the cold precipitate, containing about 75 percent of the cholesterol and only about 25 percent of the solids of the original plasma, immediately is dissolved in equine or bovine serum at room temperature. The amount of serum used for this purpose may be as small as one fourth the original volume of human plasma. A fibrin clot begins to form within a few minutes. This mixture has been kept up to 5 days at 5° (before combination with the main bulk of serum as described below.)

The fibrin clot which formed in the solution of the cholesterol rich precipitate is broken up into small chunks, and the mixture is strained through a nylon screening cloth with mesh opening size 297 M (No. 50-297). Appropriate volumes of equines or bovine serum and/or egg extract are added to bring the cholesterol and/or triglyceride concentrations, respectively, to the desired levels. The solution is filtered under nitrogen pressure through a sterilizing filter into a sterile flask and distributed with sterile equipment into sterile vials which are stored at −20°C.

If exact, predetermined levels of triglyceride or cholesterol are desired, the filtered preparation may be kept at 5° for several days while analyses are completed. Then the preparation can be diluted with filtered serum to adjust the concentration to the desired level before aliquots are dispensed.

The cholesterol rich fraction isolated from human plasma contains about 75 percent of the total cholesterol, 60 percent of the triglyceride, and only about 25 percent of the total solids of the original plasma. Chromatography on thin layers of silica gel revealed that the fraction contained appreciable amounts of phospholipid and that the ratio of cholesterol ester and cholesterol is about the same as is found in the original plasma.

Maximal yield of cholesterol at the minimal dry weight was obtained at the chosen concentration of alchohol in Example II. The temperature of the preparation must be kept below 5°C. during isolation of the cholesterol fraction; and the latter must be dissolved in serum immediately, otherwise the isolated cholesterol may become insoluble in serum.

Human serum may be substituted for human plasma as a source of the cholesterol rich fraction with no change in the procedure as described in Example 2 except that a fibrin clot does not form and need not to be removed.

Attempts to isolate a cholesterol rich fraction from animal sera were unsuccessful because the level of cholesterol in bovine or horse sera is low and no more than a 50 percent yield of cholesterol was obtained by ethanol fractionation. Also, the cholesterol fraction tended to become insoluble after addition to the animal sera.

The appearance of all sera to which the egg/triglyceride extract and/or cholesterol fraction of human plasma had been added resembled that of the original bovine or horse serum. These preparations were stored at −20°C. until analyzed. After these samples were frozen and thawed three times, the solutions still retained their original transparent appearance with no indication of separation of the added liquid fractions.

The total cholesterol, triglyceride, and phospholipid content of horse or bovine sera to which the lipid fractions were added cover a wide range of concentrations. Thus as can be seen in Table I (below) the cholesterol level of these preparations as determined by the Abell-Kendall method ranged from 94 to 357 mg/100 ml.; that of triglycerides ranged from 5 to 362 mg/100 ml. (from 0.06 to 4.20 mM); that of the total phospholipids from 26 to 397 mg/100 ml.; or as total lipid P from 1.04 to 15.9 mg/100 ml. These concentrations exceed both the lower and higher limits of the range of these constituents as found in normal human serum. Despite this great variation in lipid content, only a small increase in dry weight or protein content was noted in the sample of high lipid concentration: Even at the level of over 1000 mg/100 ml. of the three main lipid classes (pool No. 4), the protein levels and dry weight each increased only about 20 percent. In agreement with these findings, the addition of the lipid fractions did not change noticeably the viscosity or surface tension of the serum as evidenced by behavior during the operations of pipetting or extracting for the Abell-Kendall method of cholesterol or a semiautomated method for triglyceride. Similarly no unusual behavior was noted during the analysis of the serum pools for cholesterol with the semiautomated Technicon N-77 procedure in which a modified Liebermann-Burchard reagent is employed. Although the cholesterol levels as determined by the N-24 method were higher than those found with the Abell-Kendall or automated method employing the Liebermann-Burchard reagent, the difference seems to be attributable to the method rather than interference from the triglyceride fraction since the same tendency is noted with different amounts of triglyceride.

It may be noted that human serum can be used in place of equine or bovine serum, for mixture with the lipid fractions to obtain control standard sera of high, e.g. 350 mg/100 ml., triglyceride or high cholesterol concentration.

range, and the albumin to globulin ratios of unaltered horse or bovine serum were the reverse of those found

TABLE 1

LIPIDS, PROTEINS, AND DRY WEIGHT OF THE POOLS

| Pool | | Cholesterol (mg %) | | | Triglycerides (mg %) | Phospholipids (mg %) | Proteins (gms/100 ml) | Albumin to globulins ratio | Dry weight (%) |
|---|---|---|---|---|---|---|---|---|---|
| No. | Components | A–K (2) | N–24 (3) | N–77 Huang (1) | | | | | |
| 1 | Horse serum + human plasma protein fraction | 183 | 194 | 187 | 60 | 209 | 8.3 | 0.5 | 9.5 |
| 2 | Horse serum + human plasma protein fraction + egg yolk extract | 186 | 203 | 188 | 293 | 283 | 7.9 | 0.5 | 9.6 |
| 3 | Horse serum + human plasma protein fraction | 357 | 397 | 371 | 151 | 327 | 9.4 | 0.3 | 11.2 |
| 4 | Horse serum + human plasma protein fraction + egg yolk extract | 352 | 390 | 365 | 362 | 397 | 9.0 | 0.4 | 11.0 |
| 5 | Horse serum | 94 | 100 | 102 | 5 | 27 | 7.6 | 0.7 | 8.7 |
| 6 | Bovine serum + human plasma protein fraction | 201 | 217 | 204 | 63 | 212 | 7.9 | 0.6 | 9.2 |
| 7 | Bovine serum + human plasma protein fraction + egg yolk extract | 202 | 220 | 200 | 202 | 256 | 7.7 | 0.5 | 9.0 |
| 8 | Bovine serum + human plasma protein fraction | 307 | 338 | 314 | 123 | 293 | 8.6 | 0.4 | 10.0 |
| 9 | Bovine serum + human plasma protein fraction + egg yolk extract | 299 | 331 | 295 | 246 | 336 | 8.3 | 0.4 | 10.0 |
| 10 | Bovine serum | 105 | 110 | 107 | 10 | 26 | 7.4 | 0.7 | 8.3 |
| 11 | Bovine serum + egg yolk extract | 100 | 111 | 107 | 328 | 221 | 6.7 | 0.7 | 8.2 |
| 12 | Horse serum + egg yolk extract | 101 | 114 | 109 | 323 | 246 | 7.1 | 0.7 | 8.5 |
| "Normal range" | | 120–250 | | | 29–134 | 125–300 | 6.3–7.8 | 1.1–1.5 | 7.0–9.0 |

Lipid classes present in the serum preparations were examined by thin layer chromatography. The lipid components usually present in human sera were present in both neutral lipids and phospholipids although the proportions among some of the classes might not be the same as in human serum.

However, the ratio of cholesterol ester to cholesterol is about the same as in human serum which is one of the main prerequisites of a preparation to be used in cholesterol determinations. Furthermore lecithin remains the major phospholipid as in the case with unaltered human serum, although the phosphatidyl ethanolamine concentration is increased when egg extract is added.

The lipid extracts were prepared in chloroform methanol and the plates were developed with hexanediethyl ether-acetic acid (80:20:1.5, v/v/v) on layers of silica gel. The spots were visualized on the plates, by spraying with sulfuric acid-dichromate and heating at 180°C. for 30 minutes. The numbers represent Pools 1–12 which are described in Table 1. The symbols designate the following classes of lipids: CHE, cholesterol esters: TG, triglycerides; FFA, free fatty acids: CH, free cholesterol: and PL, phospholipids.

The serum preparations were analyzed for the components usually determined in a clinical chemistry laboratory in order to determine whether these sera had any potential use as controls for other determinations. Only the levels, urea N (11.5 – 18.8 mg/100 ml.) and calcium (8.8 – 13.6 mg/100 ml.) were within the physiological range for man, in the preparation to which lipid fractions were added. Sodium (107 – 142 mequiv/1), chloride (70–102 mequiv/1), uric acid (0.4 – 1.0 mequiv/1), creatinine (0.7 – 1.2 mg/100 ml.), and glucose (10–52 mg/100 ml.) were too low in concentration in such preparations. On the other hand, the levels of potassium (3.8–8.8 mequiv/1) and non-lipid P (4.0 – 17.3 mg/100 ml.) were higher than the usual range for man in those sera to which triglyceride in phosphate buffer had been added. As can be seen in Table 1 the protein levels also were above the normal in man. The addition of the cholesterol fraction of plasma which contains globulin further decreases this ratio. Thus these serum preparations could be used as controls for urea or calcium determinations but would require adjustment of the concentration of the other dialyzable constituents. It is assumed even for the triglyceride, cholesterol, and phospholipid determinations that the reversed ratio of albumin to globulin would not effect the analysis.

It will be obvious to those skilled in the art that various changes may be made without departing from the scope of the invention and the invention is not to be considered limited to what is described in the specification.

What is claimed is:

1. A method for the preparation of serum for use as a control standard comprising
   isolating the lipid rich fraction of human plasma or human serum, wherein said isolating step comprises providing a conventional weak acid and dilute alcohol preparation of said plasma or serum and then centrifuging said preparation at a low speed on the order of about 1000 xg;
   collecting the resultant lipid rich precipitate; and
   adding equine, bovine or human serum to said lipid rich fraction in order to produce the desired level of lipids for use as a control standard.

2. A method in accordance with claim 1 comprising said isolating of cholesterol rich fraction from human plasma, comprising the steps of bringing frozen human plasma to room temperature, titrating said human plasma with 1.6–1.8 volume of about 0.025 M acetic acid until a pH of about 5.4 is reached, preparing a volume of absolute ethanol needed to make a mixture of about 85 percent (v/v) of titrated plasma and acetic acid and about 15 percent ethanol, bringing said titrated plasma and resultant prepared volume of absolute ethanol to a temperature of about 2°C. in an ice bath, adding said ethanol drop by drop while the said titrated plasma is stirred, keeping the temperature of the newly formed mixture below about 5°C., placing said mixture in prechilled centrifuge tubes at about −5°C. and precipitating protein for about one hour, centrifuging said tubes for about 30 minutes at about 1000 x g at about −5°C., decanting the resultant supernatant, the cold precipitate containing approximately 75 percent of the cholesterol and only about 25 percent of the solids of the original plasma.

3. A method as defined in claim 2, wherein said addition of serum comprises immediately dissolving said cold precipitate in equine or bovine serum at room temperature to bring the cholesterol concentration up to approximately 350 mg/100 ml. forming a control standard serum of high cholesterol content.

4. A method as defined in claim 1 wherein said addition of serum comprises adding a calculated volume of human serum to bring the triglyceride concentration up to approximately 350 mg/100 ml. forming a control standard serum of high triglyceride content.

5. A method as defined in claim 2, wherein said addition of serum comprises immediately dissolving said cold precipitate in human serum at room temperature to bring the cholesterol concentration up to approximately 350 mg/100 ml. forming a control standard serum of high cholesterol content.

6. A method in accordance with claim 2 wherein human serum is substituted for human plasma.

* * * * *